(12) United States Patent
Bae et al.

(10) Patent No.: US 6,473,264 B2
(45) Date of Patent: Oct. 29, 2002

(54) FILTERING APPARATUS FOR HARD DISK DRIVE

(75) Inventors: Byoung-young Bae, Pyeongtak (KR); Bu-hyun Sung, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 63 days.

(21) Appl. No.: 09/725,806

(22) Filed: Nov. 30, 2000

(65) Prior Publication Data

US 2001/0017744 A1 Aug. 30, 2001

(30) Foreign Application Priority Data

Feb. 24, 2000 (KR) .............................................. 00-9083

(51) Int. Cl.[7] .............................................. G11B 33/14
(52) U.S. Cl. .................................................... 360/97.02
(58) Field of Search ............................ 360/97.02, 97.01

(56) References Cited

U.S. PATENT DOCUMENTS

| | | | | |
|---|---|---|---|---|
| 4,282,554 A | * | 8/1981 | Ho et al. .................. | 360/97.02 |
| 5,034,835 A | * | 7/1991 | Yokoyama ................ | 360/97.02 |
| 5,101,305 A | * | 3/1992 | Ohkita et al. ............. | 360/97.02 |
| 5,517,372 A | * | 5/1996 | Shibuya et al. .......... | 360/97.02 |
| 5,995,323 A | * | 11/1999 | Jinbo et al. ............... | 360/97.02 |
| 6,008,965 A | * | 12/1999 | Izumi et al. .............. | 360/97.03 |

* cited by examiner

*Primary Examiner*—Hoa T. Nguyen
*Assistant Examiner*—Julie Anne Watka
(74) *Attorney, Agent, or Firm*—Sughrue Mion, PLLC

(57) ABSTRACT

A hard disk drive filtering apparatus for filtering particles from flowing air generated while a hard disk installed within a housing rotates, the apparatus including a holder installed within the housing, and a filter supported by the holder, the filter having at least a pair of filter plates connected to be met at predetermined angles, wherein the flowing air is filtered while being entered into the space formed by the filter plates.

9 Claims, 7 Drawing Sheets

FILTERING APPARATUS FOR HARD DISK DRIVE

BACKGROUND OF THE INVENTION

1. Field of the Invention

The present invention relates to a filtering apparatus for hard disk drive, and more particularly, to a hard disk drive filtering apparatus for filtering particles within a housing in which a hard disk is installed.

2. Description of the Related Art

FIG. 1 is an exploded perspective view of an example of a hard disk drive which is used as a memory device of computers. Referring to FIG. 1, a hard disk drive includes a housing 1 and a hard disk 4 and a filtering apparatus which are installed within the housing 1.

The housing 1 includes a base 3 on which the hard disk 4 is rotatably installed, and a cover member 2 which is coupled to the base 3 to cover and protect the hard disk 4 and other members. The hard disk 4 typically has a multi-layered structure to record a large quantity of information. A head 6 installed at the end of an actuator arm 5 records information in the hard disk 4 which rotates at high speed, or reproduces recorded information.

The filtering apparatus filters particles such as dust which unnecessarily remain within the housing 1. The filtering apparatus includes a filter 7 and a holder 8 for supporting the filter 7.

For example, the filter 7, which is for filtering particles, has a structure like that of a sponge. The holder 8 protrudes from the bottom surface 2a of the cover member 2. A pair of holders 8 are formed to be separated a predetermined distance apart from each other to support both sides of the filter 7.

In this structure, when the hard disk 4 rotates in a direction indicated by arrow A, particles within the housing 1 are moved by air flow due to the rotation of the hard disk 4. The moving particles are mostly driven toward the side portion of the cover member 2 and filtered out by the filter 7.

However, as shown in FIG. 2, in a conventional filtering apparatus, gaps G1 and G2 are formed between the filter 7 and the housing 1. The gap G1 is formed between the filter 7 and the bottom surface 2a of the cover member 2, and the gap G2 is formed between the filter 7 and the upper surface 3a of the base 3. In this structure, some particles within the housing 1 pass through the gaps G1 and G2 without being filtered out by the filter 7. Therefore, the filter 7 does not completely remove all of the particles.

SUMMARY OF THE INVENTION

An objective of the present invention is to provide a hard disk drive filtering apparatus having an improved holder and an improved filter to increase a filtering effect.

To achieve the above objective, the present invention provides a hard disk drive filtering apparatus for filtering particles from flowing air generated while a hard disk installed within a housing rotates, the apparatus including a holder installed within the housing; and a filter supported by the holder, the filter having at least a pair of filter plates connected to be met at predetermined angles, wherein the flowing air is filtered while being entered into the space formed by the filter plates.

The filter has a case-shaped structure in which one side is open to introduce the flowing air while the other side is closed.

The holder includes: protrusions which extend from the bottom or ceiling within the housing and form a receiving groove for shielding and supporting one side of the filter; and a supporting groove depressed from the bottom or ceiling within the housing to face the receiving groove, for receiving the other side of the filter.

The hard disk drive filtering apparatus further includes an air guider formed in a body with the holder so that its one surface faces the rim of the hard disk, wherein the air guider guides air to flow toward the entrance of the filter and guides air which has passed through the filter.

The filter is located within the range of a predetermined angle formed by a pair of straight lines from the rotation center of the hard disk to both ends of the air guider.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENT

Figure 1:
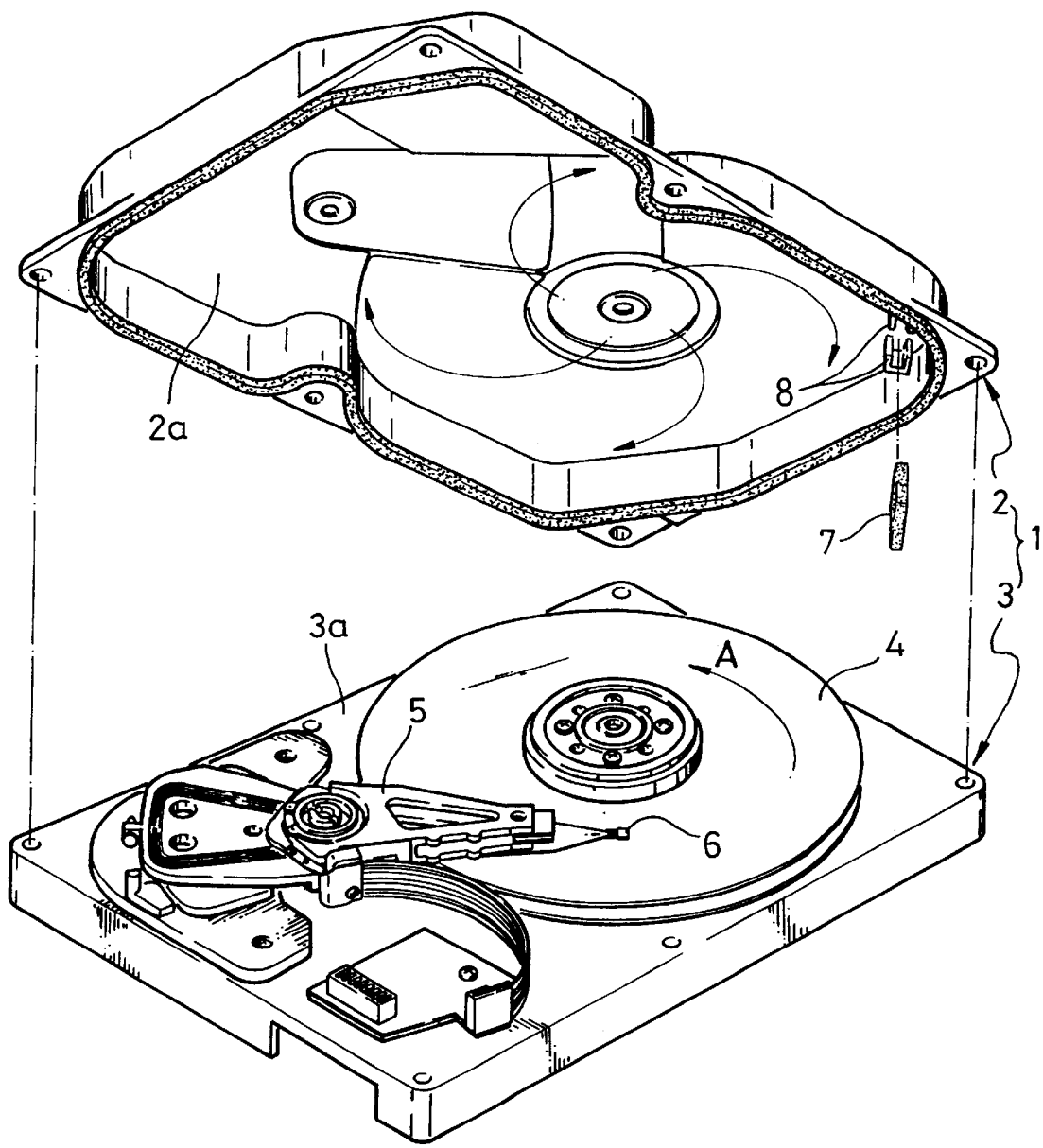
FIG. 1 is a schematic exploded perspective view of a typical hard disk drive.
Figure 2:
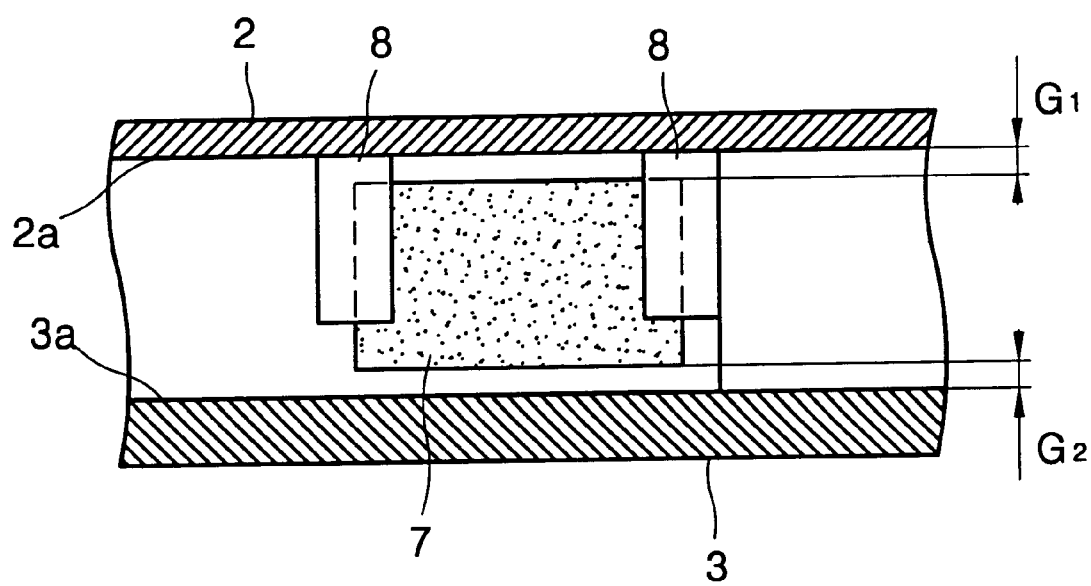
FIG. 2 is a schematic cross-sectional view of the essential portions of FIG. 1.
Figure 3:
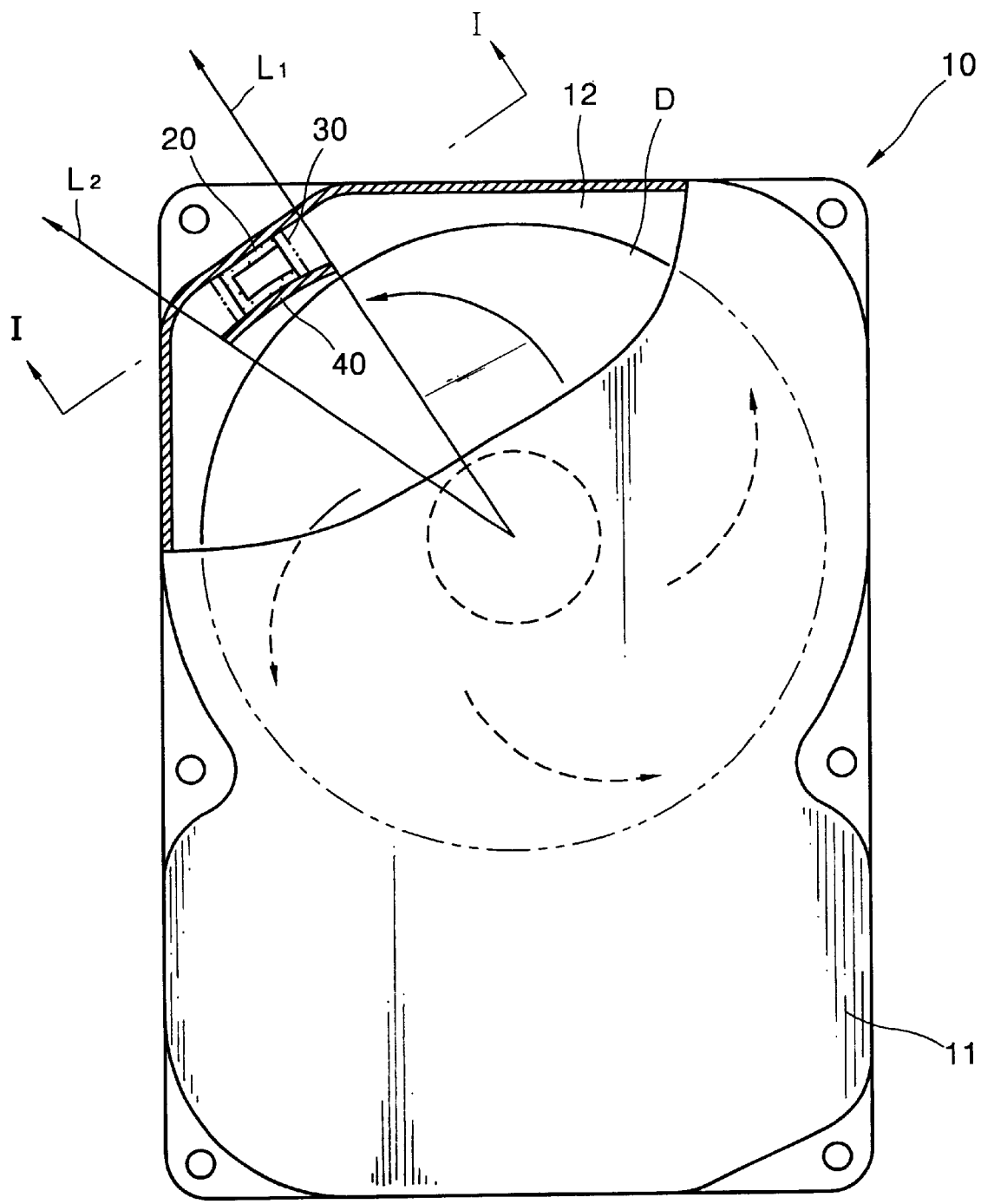
FIG. 3 is a schematic partially cross-sectional view of a hard disk drive having a filtering apparatus according to an embodiment of the present invention.
Figure 4:
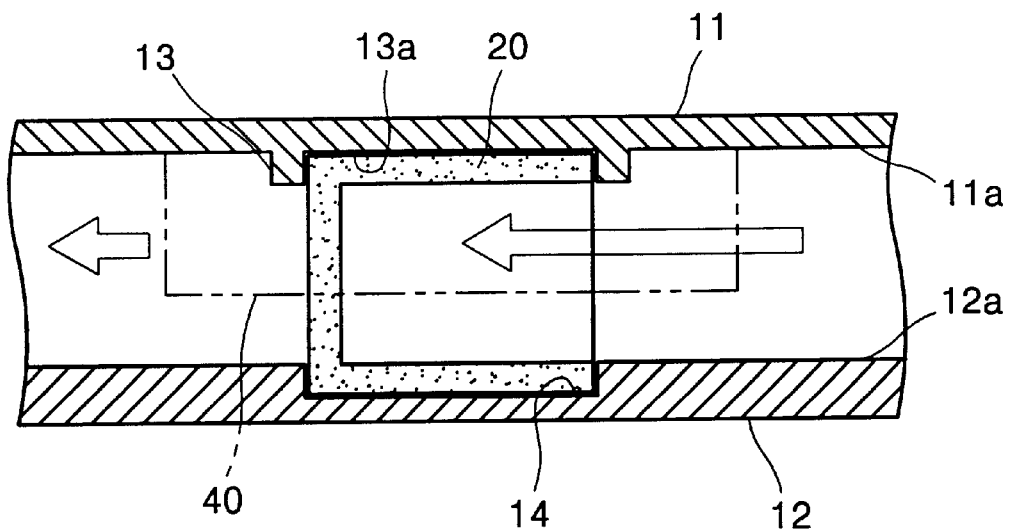
FIG. 4 is a schematic cross-sectional view taken along line I—I of FIG. 3.

FIG. 3 is a partial cross-sectional view of a housing 10 adopting a filtering apparatus according to an embodiment of the present invention, and FIG. 4 is a cross-sectional view taken along line I—I of FIG. 3. The housing 10 includes a base 12 and a cover 11 coupled to the base 12. The base 12 has a hard disk D rotatably installed thereon.

The filtering apparatus according to an embodiment of the present invention includes a filter 20 for filtering particles, such as dust or the like, included within the housing 10, and a holder 30 installed within the housing 10 to support the filter 20.

As shown in FIG. 4, the holder 30 includes a protrusion 13 extending from the ceiling 11a within the housing 10, and a supporting groove 14 depressed from the bottom 12a within the housing 10. The protrusion 13 is formed to be incorporated in the body of the cover 11, and has a receiving groove 13a for receiving and supporting the upper portion of the filter 20. The supporting groove 14 shields and supports the lower portion of the filter 20, and has a depth corresponding to the thickness of the filter 20 to prevent a gap from being formed between the filter 20 and the bottom 12a. Likewise, it is preferable that the receiving groove 13a is formed to have a depth corresponding to the thickness of the filter 20.

Figure 5:
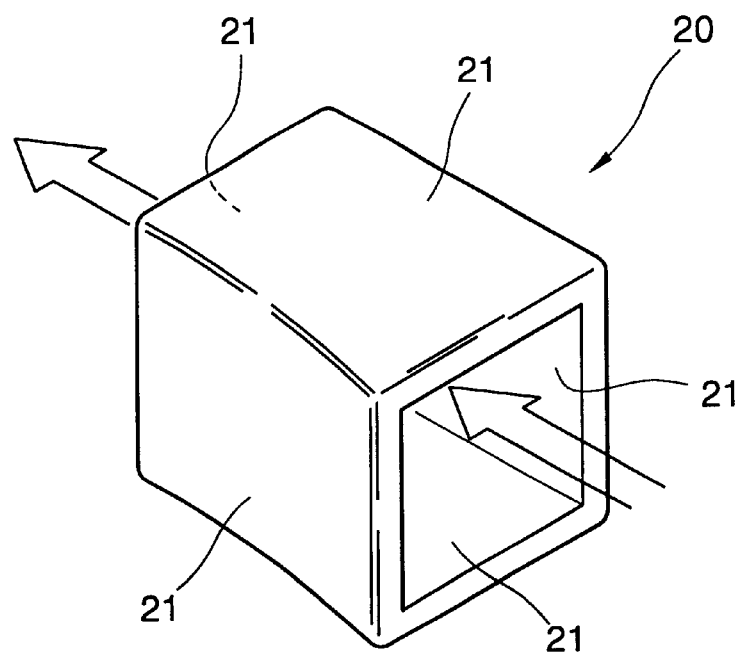
FIG. 5 is a perspective view of the filter of FIG. 3.

As shown in FIG. 5, the filter 20 has a case-shaped structure in which its one side is open to receive flowing air within the housing 10 while the other side is closed to filter entered air. That is, the filter 20 according to the first embodiment of the present invention is shaped of a three-dimensional square pillar. Thus, the filter 20 is designed by connecting five filter plates 21 in the direction of the inflow of air so that they face each other. The upper and lower plates of the filter 20 having such a structure are entered in and supported by the supporting groove 14 and the receiving groove 13a, respectively, such that no gap is formed between the filter 20 and the ceiling 11a and between the filter 20 and the bottom 12a. Hence, most of the air flowing toward the filter 20 is filtered by the filter 20. Further, the filter 20 has a plurality of facets in contrast to the prior art, so that the area contacting flowing air becomes wider, thus increasing the filtering effect.

An air guider 40 is further installed within the housing 10. The air guider 40 guides flowing air toward the entrance of the filter 20 and guides air, which has passed through the filter 20 and output to the outlet. The air guider 40 is formed to be incorporated in the body of the holder 30 so that its one surface face the rim of a hard disk D, and is formed over the holder 30 to increase the guiding effect of air. Also, it is preferable that the air guider 40 has a sufficient length so that the filter 20 is located within the range of a predetermined angle formed by first and second straight lines L1 and L2. Here, the first and second straight lines L1 and L2 denote virtual lines from the rotation center of the hard disk D to both ends of the air guider 40, respectively. As described above, if the air guider 40 has a sufficient length, it can block flowing air which flows back toward the outlet of the filter 20. Further, the filter 20 filters only air flowing toward the entrance of the filter 20 and air flowing from the outlet of the filter 20, thereby increasing the filtering efficiency.

Figure 6:
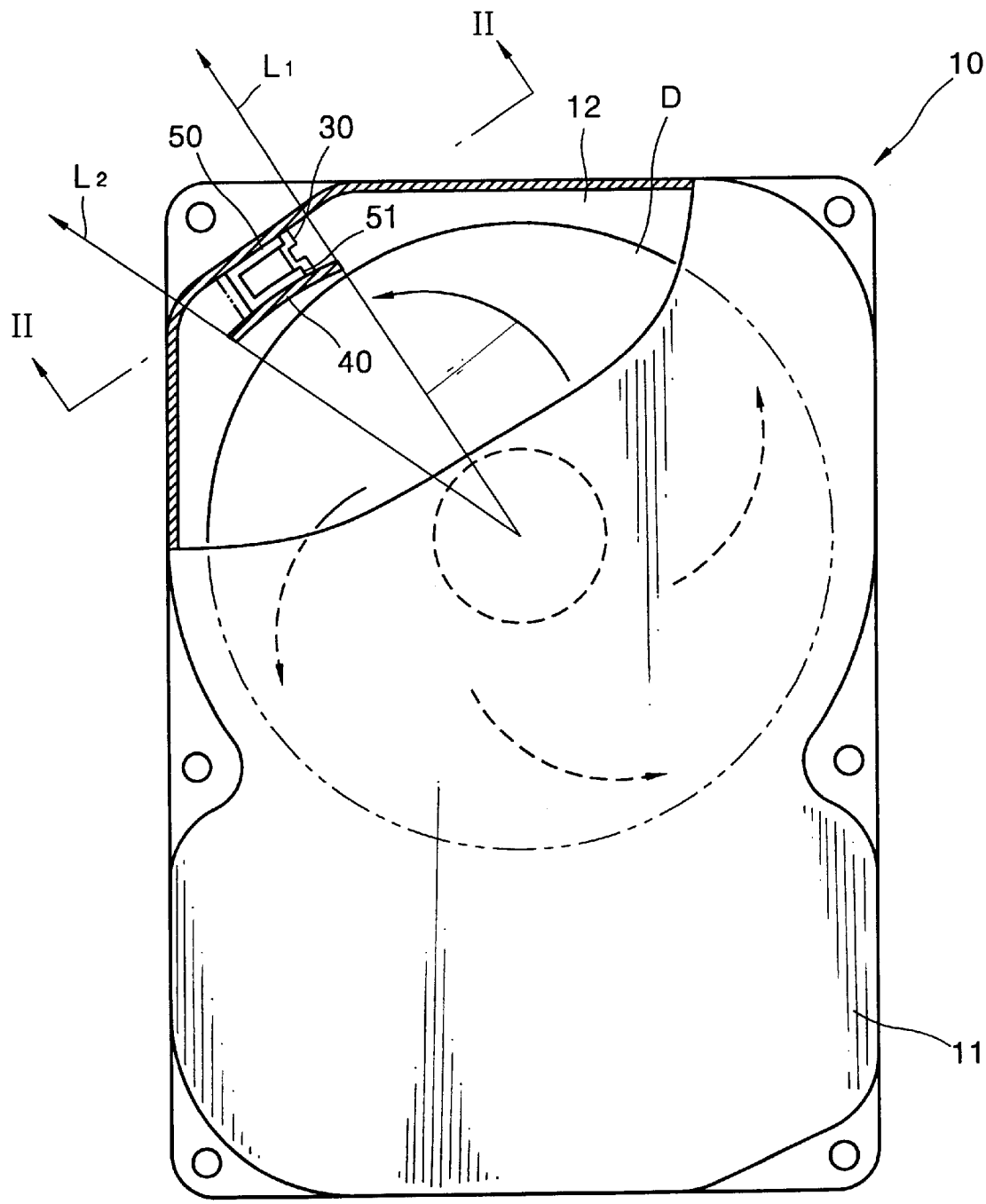
FIG. 6 is a schematic partially cross-sectional view of a hard disk drive having a filtering apparatus according to another embodiment of the present invention.
Figure 7:
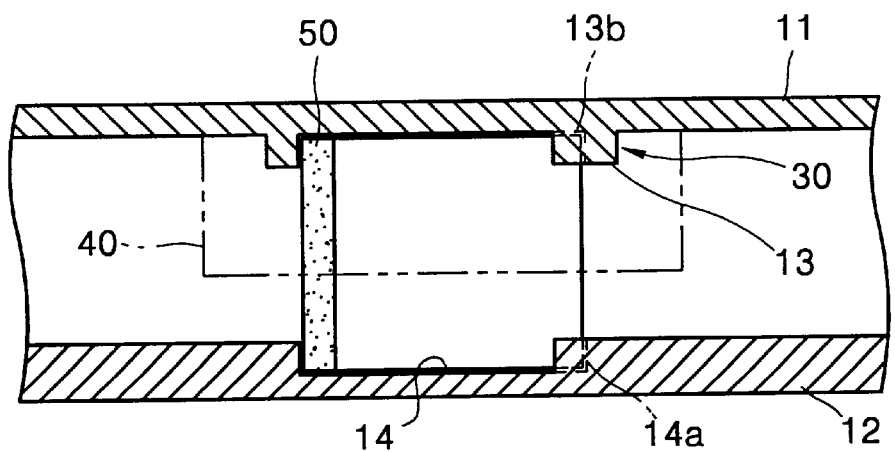
FIG. 7 is a schematic cross-sectional view taken along line II—II of FIG. 6.

FIG. 6 is a partially cross-sectional view showing the rear surface of a hard disk drive having a filtering apparatus according to another embodiment of the present invention. FIG. 7 is a cross-sectional view taken along line II—II of FIG. 6. Here, the same reference numerals as those in FIGS. 3 and 4 denote the same elements.

Referring to FIGS. 6 and 7, a filter 50 installed within the housing 10 has a U-shaped structure. The filter 50 has three filter plates connected to meet at predetermined angles. The leading ends 51 of the filter 50 are clamped by fixing grooves 13b and 14a respectively formed on the protrusion 13 and the supporting groove 14. Accordingly, the leading ends 51 of the filter 50 is prevented from being shaken by flowing air. Thus, the entrance of the filter 50 is prevented from being trembled and narrowed, and generation of a gap between the filter 50 and the housing 10 is also prevented.

Figure 8:
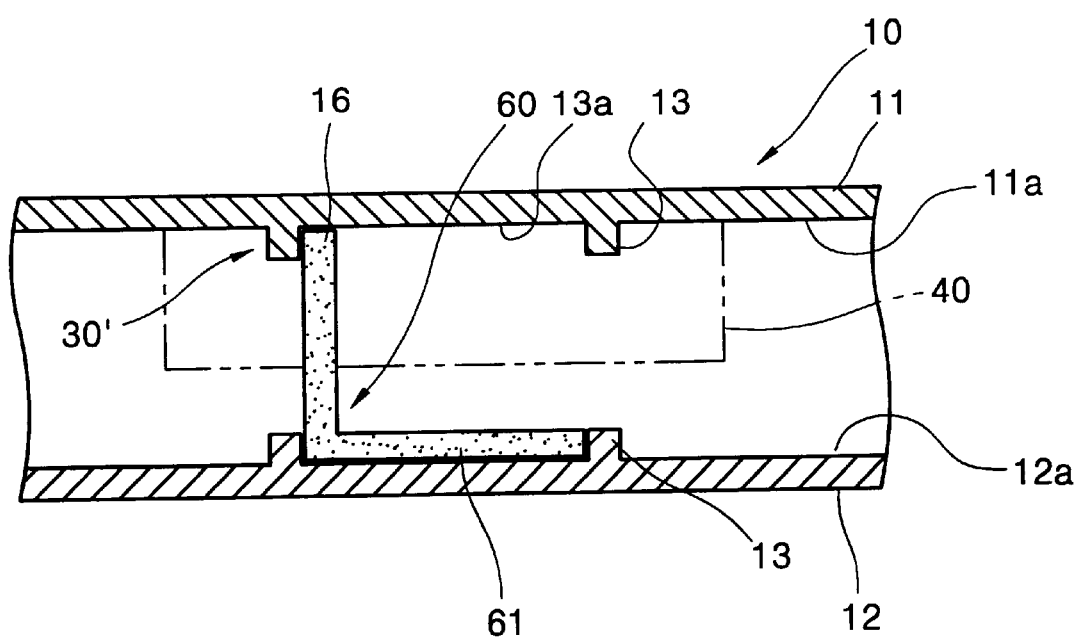
FIGS. 8 through 10 are views schematically illustrating the other embodiments of a filter in a filtering apparatus according to the present invention.

FIG. 8 is a cross-sectional view schematically illustrating a filtering apparatus according to still another embodiment of the present invention. Here, the same reference numerals as those in FIGS. 3 and 4 denote the same elements.

A filter 60 shown in FIG. 8 has a pair of filter plates 61 connected to be met at a right angle. That is, for example, the filter 60 has a L-shaped structure. A holder 30' for supporting the filter 60 includes a pair of protrusions 13 which extend from the ceiling 11a and the bottom 12a of the housing 10 to face each other. Two protrusions 13 on the ceiling 11a forms a receiving groove 13a for shielding and supporting the lower portion of the filter 60, and two protrusions 13 on the bottom 12a forms a receiving groove 13a for shielding and supporting the upper portion of the filter 60.

Figure 9:
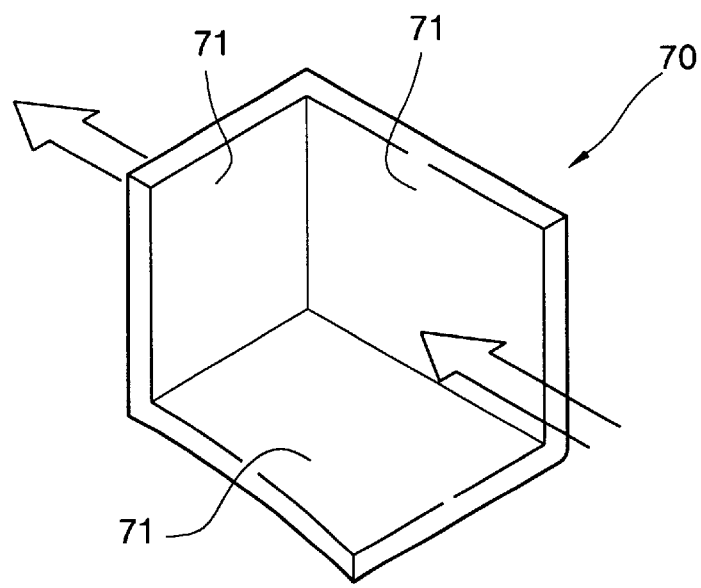

A filter 70 shown in FIG. 9 has three filter plates 71 connected at approximately right angles. Preferably, the three filter plates 71 can be formed in a body.

Figure 10:
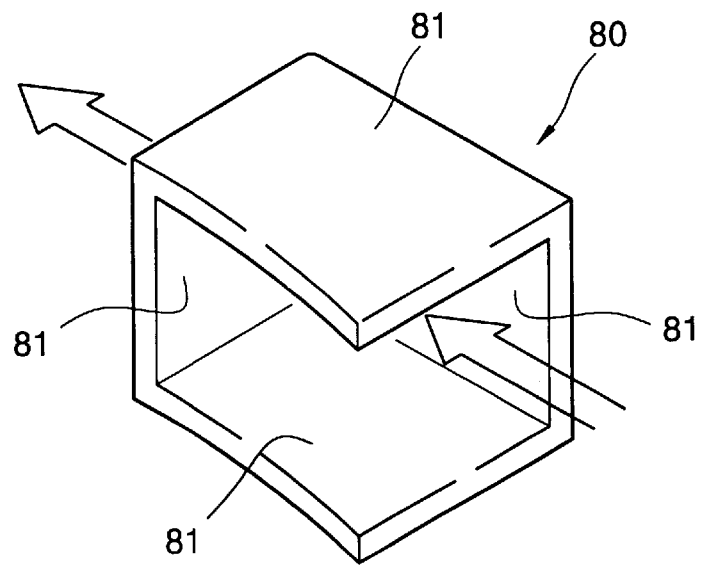

A filter 80 shown in FIG. 10 has four filter plates 81 connected at predetermined angles. Alternatively, the four filter plates 81 can be formed in a body.

In the hard disk drive filtering apparatuses according to the present invention described above, a gap is not formed between the filter and the housing. Therefore, the filtering apparatuses according to the present invention can increase the filtering efficiency compared to a conventional filtering apparatus.

Further, the filters of the filtering apparatuses according to the present invention have a three-dimensional structure, so that the area contacting flowing air becomes wider, thereby increasing the filtering effect.

Therefore, particles can be eliminated from a housing within a short time, and pollution of component parts of hard disk drives and malfunction of hard disk drives, which are caused by particles, can be minimized.

What is claimed is:

1. A hard disk drive filtering apparatus for filtering particles from flowing air generated when a hard disk installed within a housing rotates, the apparatus comprising:

a holder installed within the housing; and a filter supported by the holder, the filter comprising at least two filter plates connected at a substantially right angle, wherein the flowing air is filtered while being entered into a space formed by the filter plates, and one of the filter plates is disposed at a position substantially perpendicular to a flow direction of the flowing air passing through the space formed by the filter plates.

2. The hard disk drive filtering apparatus of claim 1, wherein the filter has a case-shaped structure having a first side which is open to introduce the flowing air and a second side which is closed.

3. The hard disk drive filtering apparatus of claim 1, wherein the holder comprises:

protrusions which extend from an upper interior surface of the housing or a lower interior surface of the housing and form a receiving groove for shielding and supporting a first side of the filter; and a supporting groove formed in the upper interior surface of the housing or the lower interior surface of the housing to face the receiving groove, for receiving a second side of the filter.

4. The hard disk drive filtering apparatus of claim 1, further comprising an air guider formed in a body with the holder so that one surface of the air guider faces the hard disk, wherein the air guider guides the flowing air toward an entrance of the filter and guides the flowing air which has passed through the filter.

5. The hard disk drive filtering apparatus of claim 4, wherein the filter is located within a range of a predetermined angle formed by a pair of straight lines extending from a rotation center of the hard disk to opposite ends of the air guider.

6. The hard disk drive filtering apparatus of claim 1, wherein one of said at least two filter plates extends from an upper interior surface of the housing to a lower interior surface of the housing so that there is no gap between the filter and the upper interior surface of the housing and the filter and the lower interior surface of the housing.

7. The hard disk drive filtering apparatus of claim 1, wherein the filter includes three filter plates connected at substantially right angles.

8. The hard disk drive filtering apparatus of claim 1, wherein the filter includes four filter plates connected at substantially right angles.

9. The hard disk drive filtering apparatus of claim 1, wherein the filter includes five filter plates connected at substantially right angles and forming a rectangular case-shaped structure having a first side which is open to introduce the flowing air and a second side which is closed.

* * * * *